Dec. 5, 1933.　　　　J. A. SERRELL　　　　1,937,598
CONTROL SYSTEM
Filed Sept. 11, 1929　　　9 Sheets-Sheet 1

Witnesses:
Harry R. L. White.
Robert Cremer

Inventor:
John A. Serrell.
By Attys

Dec. 5, 1933.   J. A. SERRELL   1,937,598
CONTROL SYSTEM
Filed Sept. 11, 1929   9 Sheets-Sheet 2
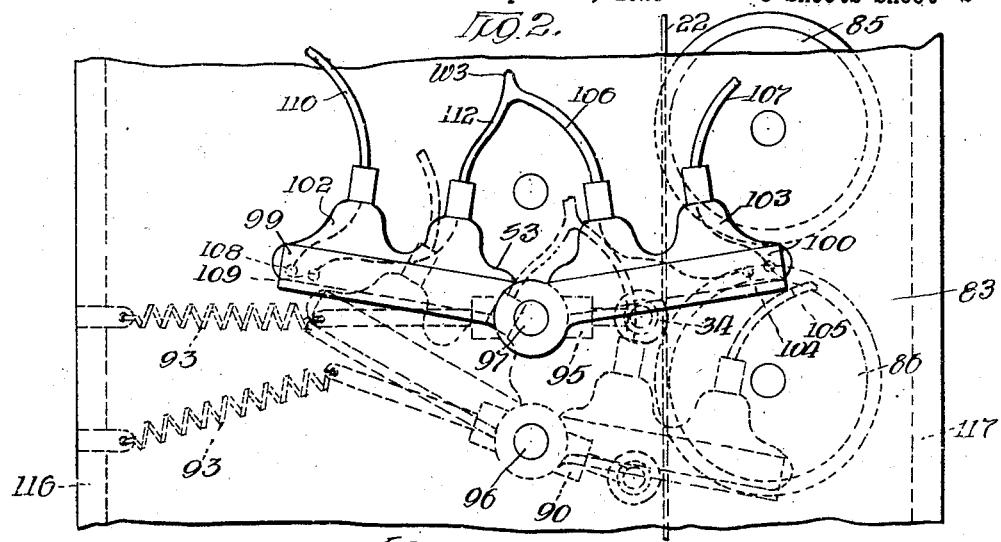
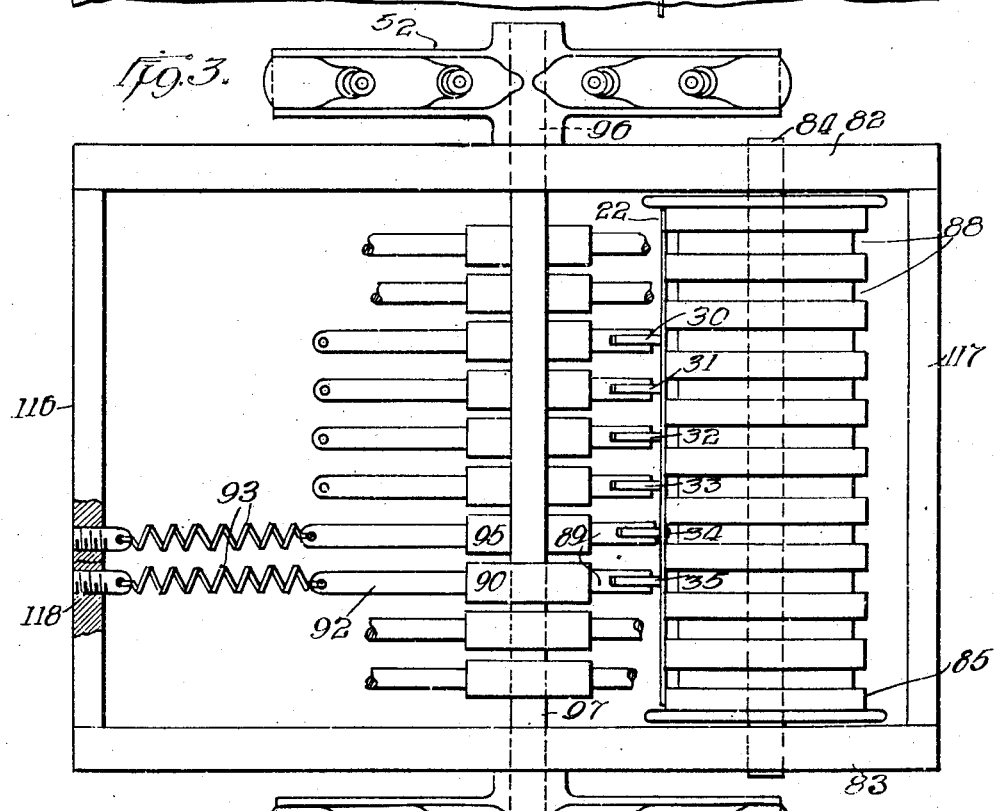
Inventor
John A. Serrell Dec. 5, 1933.   J. A. SERRELL   1,937,598
CONTROL SYSTEM
Filed Sept. 11, 1929   9 Sheets-Sheet 3
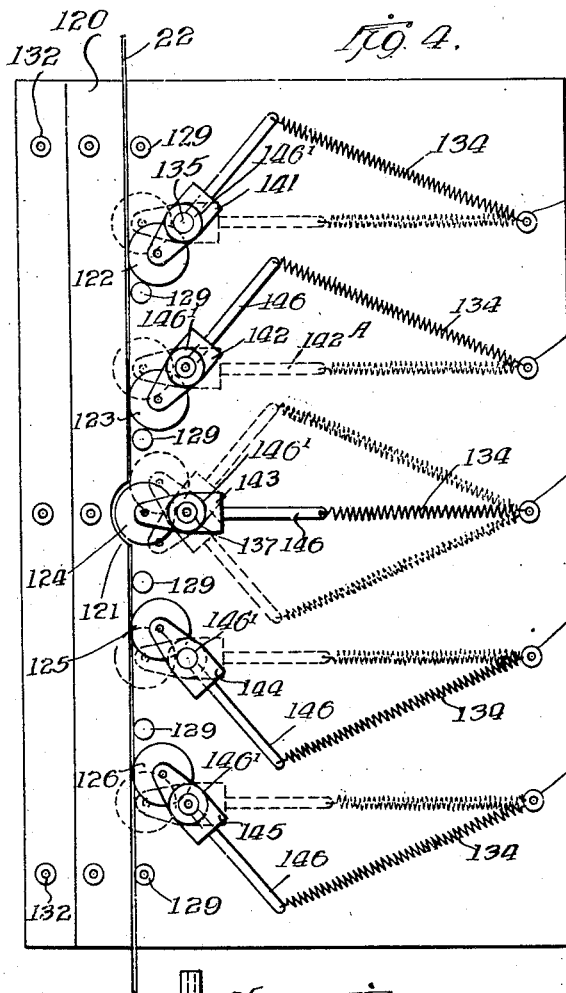
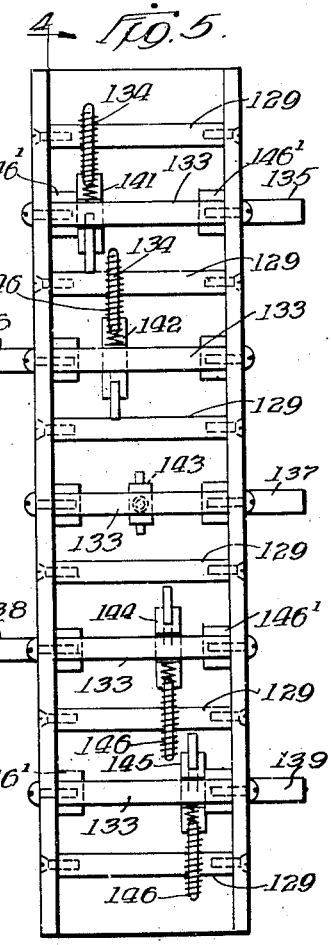
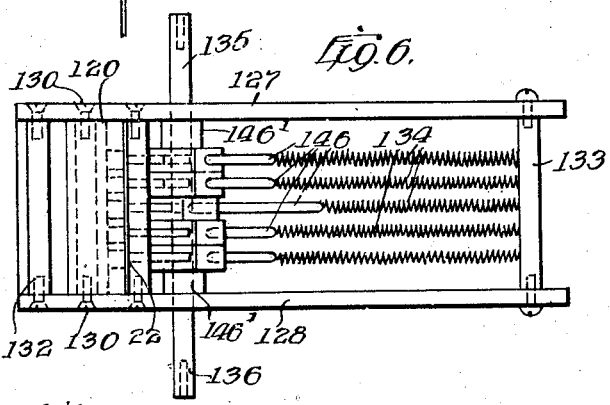
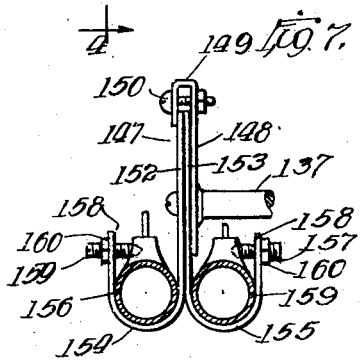
Witnesses:
Harry R. L. White
Robert Cremer
Inventor:
John A. Serrell
By Brown, Jackson, Boettcher & Dienner
Attys.

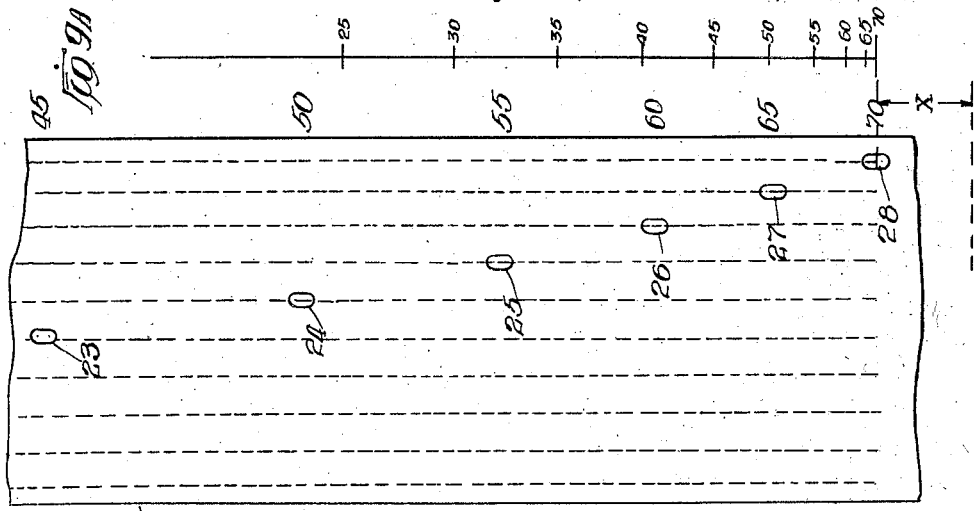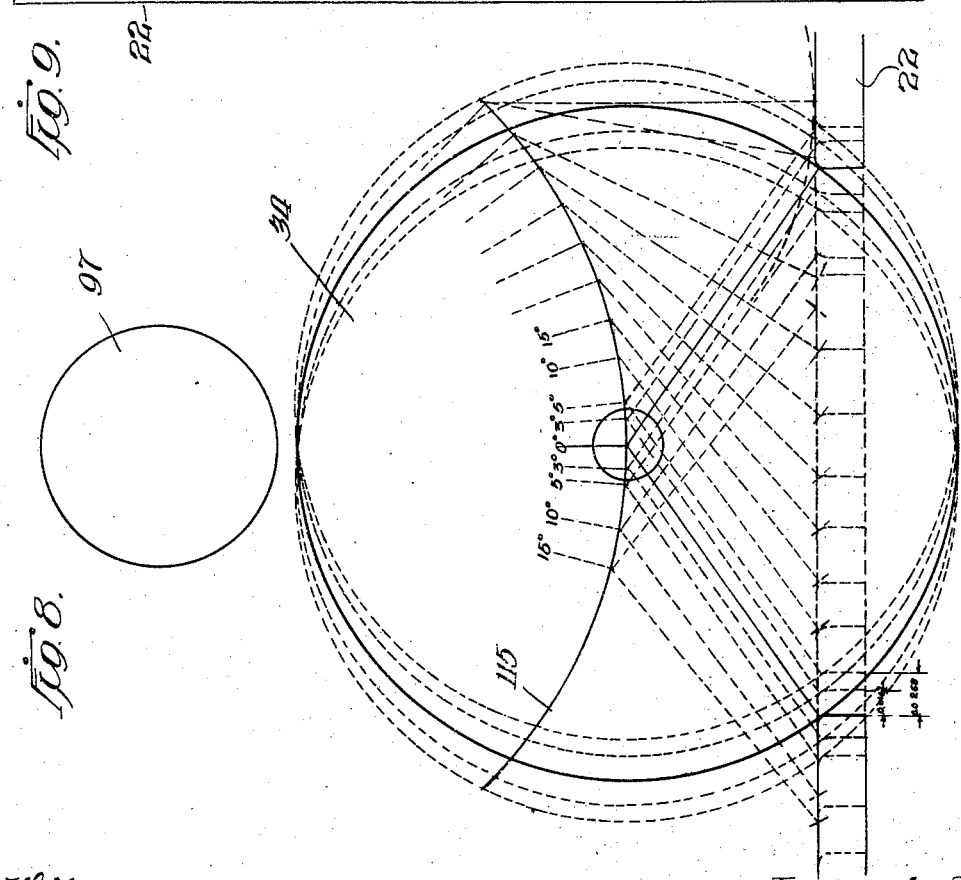

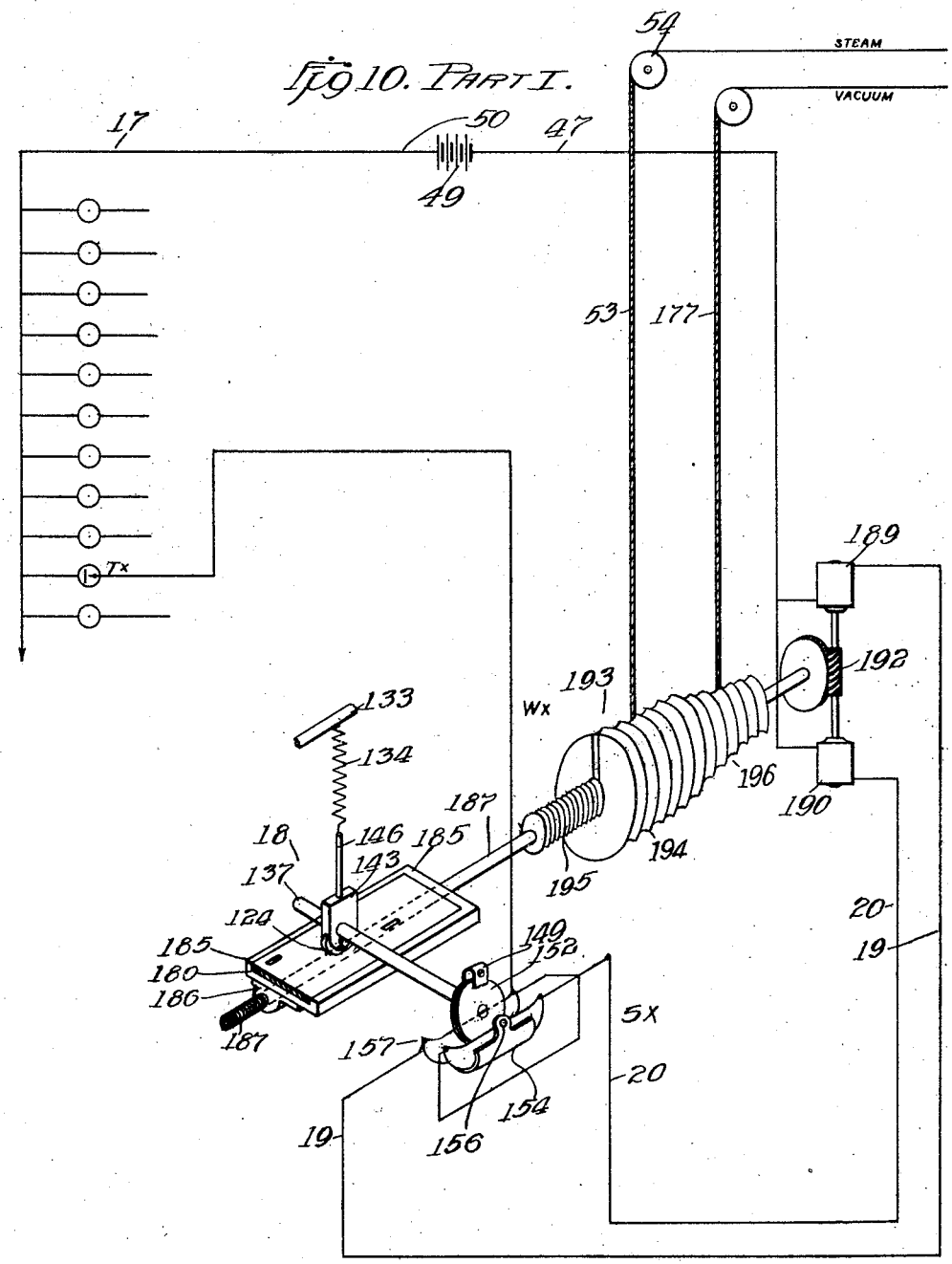

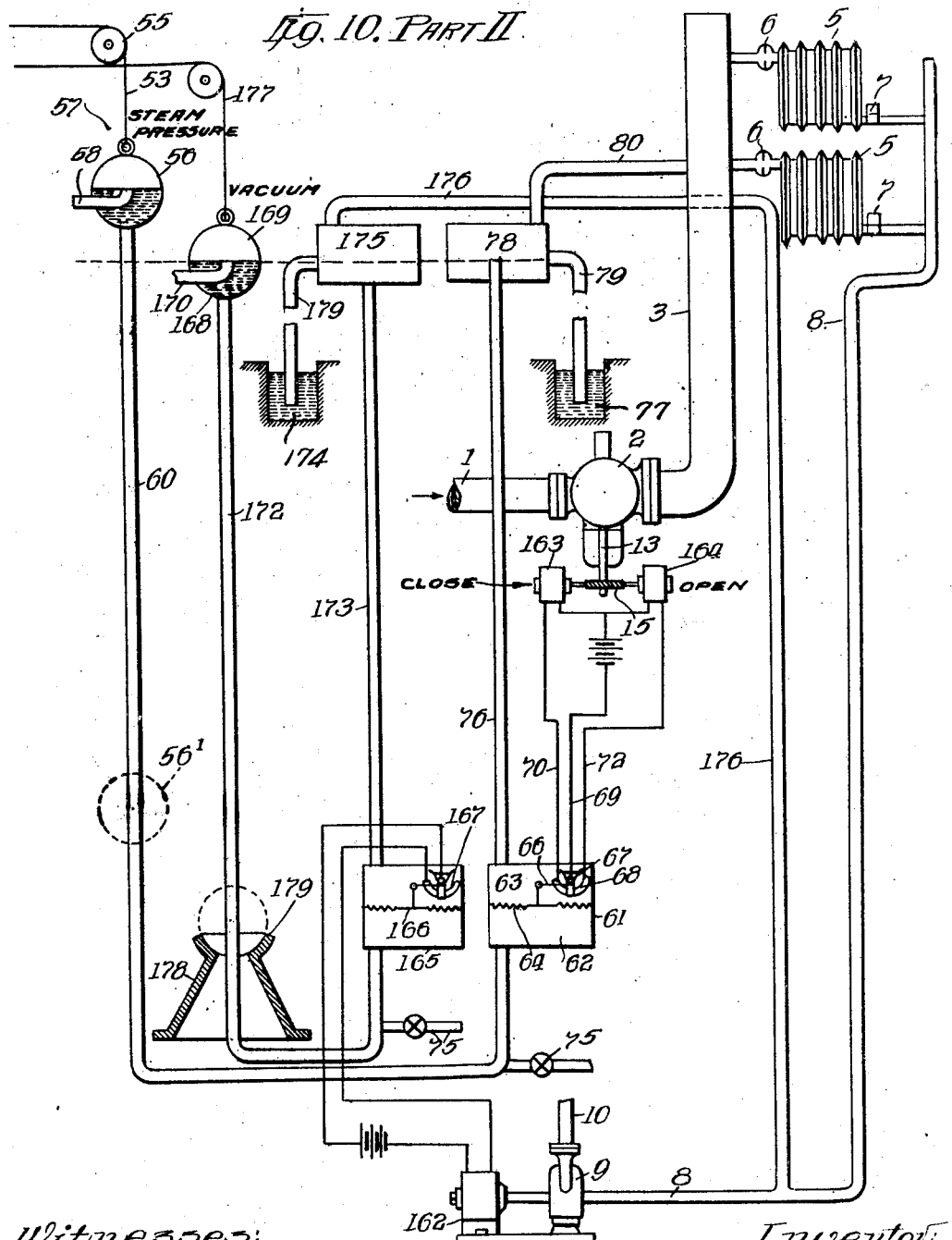

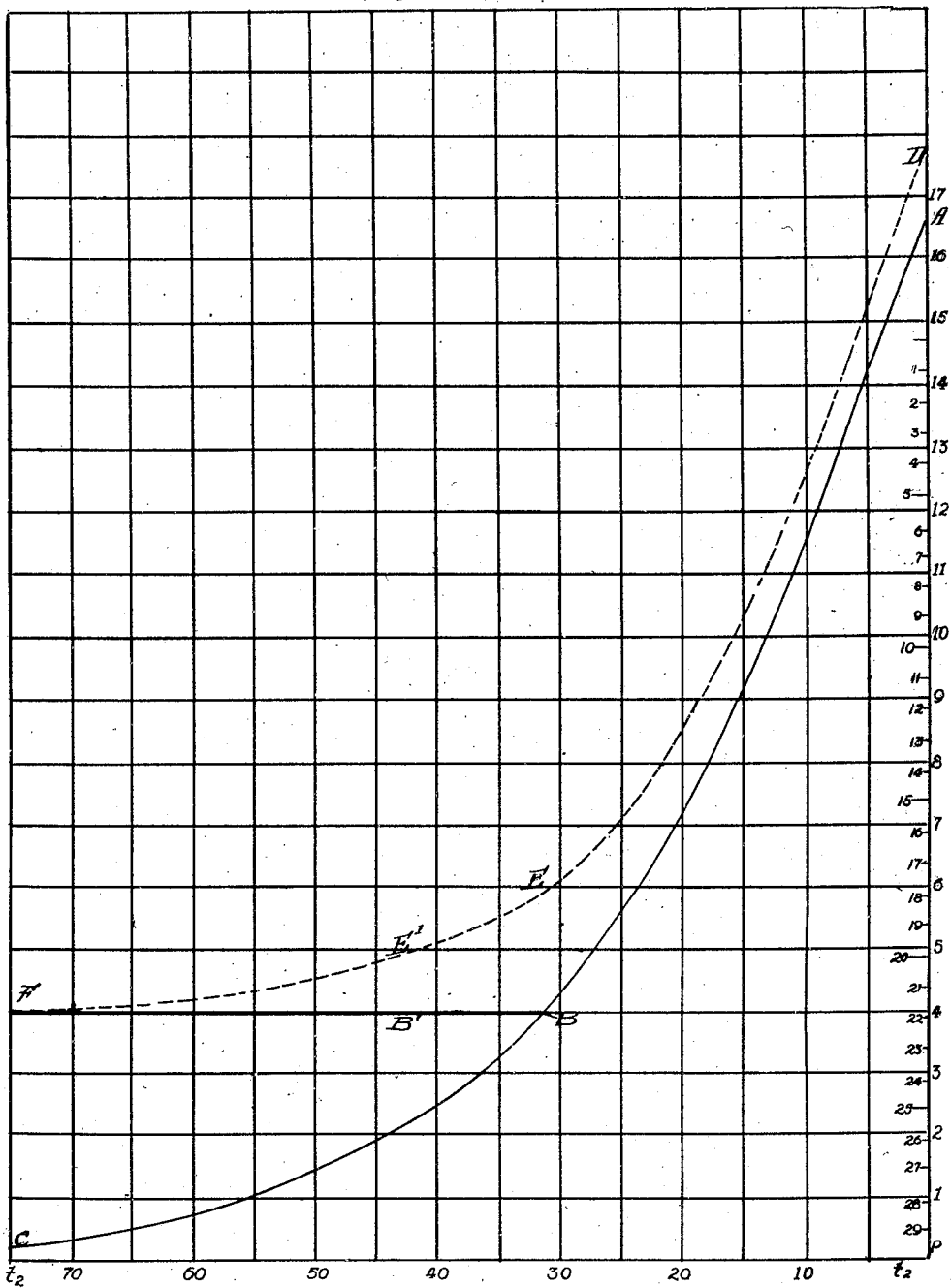

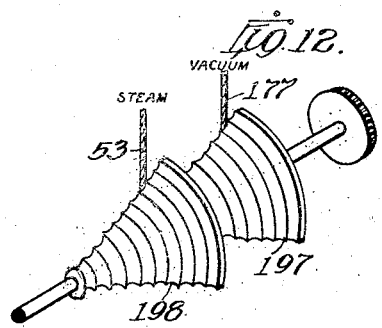
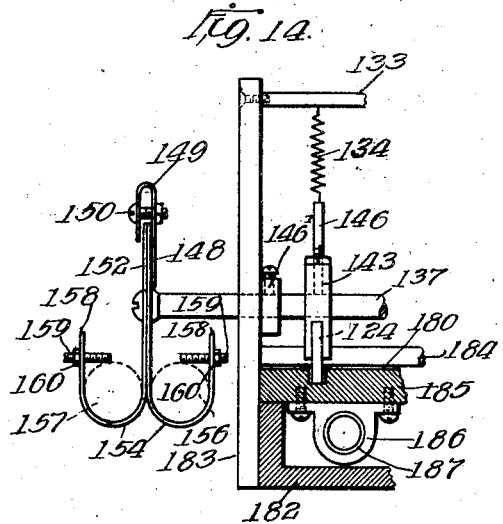
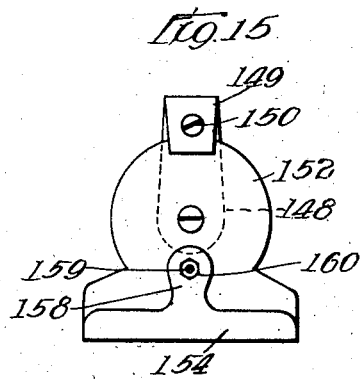
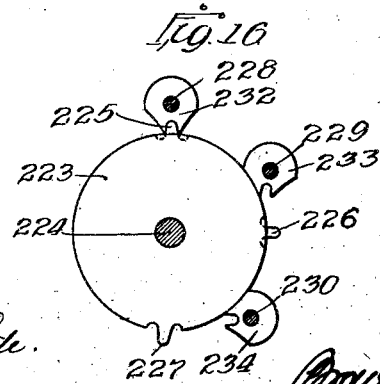

Dec. 5, 1933.　　　J. A. SERRELL　　　1,937,598
CONTROL SYSTEM
Filed Sept. 11, 1929　　　9 Sheets-Sheet 9

Witnesses
Harry R. L. White
Robert Ames

Inventor:
John A. Serrell
By Brown, Jackson, Boettcher & Dienner Attys.

Patented Dec. 5, 1933

1,937,598

UNITED STATES PATENT OFFICE 1,937,598

CONTROL SYSTEM

John A. Serrell, Passagrille, Fla.

Application September 11, 1929
Serial No. 391,721

4 Claims. (Cl. 172—239)

My invention relates to controllers for causing a predetermined responsive action in accordance with the governing action of one or more control devices or circuits which are under the control of a variable.

While I have shown the invention as embodied in a steam heating system to which the controller of my invention has particular application, I do not intend the invention to be limited to this specific use nor to any particular field.

I shall first show the applicability of my controller to a steam heating system and explain certain novel combinations and methods in the steam heating field and then shall explain the general utility of the controller.

In my copending application Serial No. 356,650 I have shown a system of steam heating wherein by the interposition of a cam, variations in temperature as measured in unit increments or decrements are caused to vary the flow of steam supplied to a building, or a part thereof, for maintaining the same at a predetermined temperature. As is well known the heat loss from a building is a function of temperature difference between inside and outside. Any properly designed heating system should normally operate to supply this heat loss. Where automatic control of the type disclosed in my aforesaid application is provided and the heat released or emitted by the radiators is caused to be dependent upon variations of pressure of the steam supply main leading to the radiators, the control of steam flow being preferably exercised by orifices through at least a part of the operating range, it is necessary to interpose a conversion member to convert unit increments of temperature change into the desired variations of steam pressure supplied to the orifices.

In my prior application the conversion function is performed by a controller embodying a cam operating upon the law of $$\frac{da}{dt} = x,$$

wherein $da$ is an increment of angular motion of the cam and $dt$ is an increment of cam throw or radical motion and $x$ is a variable. It is well known that the flow of fluids through an orifice follows, in general, the law of freely falling bodies where the velocity of flow is proportional to the square root of the pressure difference.

In the prior application one of the increments preferably, but not necessarily, has a constant value to correspond to the uniform steps of temperature measurement, and the other increment is non-uniform to produce non-uniform steps of steam pressure applied to the radiators for effecting heat deliveries in proportion to the prevailing temperature differences.

It is, of course, not essential that the steps in temperature be equal. They may vary according to any selected plan, but for ease in construction and operation uniform steps of temperature variation are preferably employed. That is, while I prefer to have $da$ a constant it may be a variable.

The present controller operates upon the same general principle of providing definite increments of steam pressure for selected increments of temperature change to secure the desired heat delivery to equalize the loss due to temperature difference.

The characteristic positioning element or responsive element of my invention is a movable member bearing a series of control notches or recesses which in effect constitute a series of cam recesses or drops and each of these cam drops governs a starting circuit which is also governed by the successive positions or actions of the governing device or devices.

For example, assume that a thermometer or thermostat having either a common responsive element or a series of responsive elements selects one of a series of circuits for a predetermined value of temperature. This operates a starting circuit which starts the movement of the positioning or responsive element. The positioning or responsive element cooperates with circuit controllers arranged in series relation to the aforesaid selective circuit and the starting circuit for opening the selected control circuit and the starting circuit to stop the positioning element in a predetermined position.

The positioning element includes connections to an element or device the position or condition of which is to be varied in accordance with the position or condition of a governing member, that is in this case the thermostat or thermometer or any device which as to position or any other characteristic follows the action of a controlling variable. This may be a valve, pressure regulator, hydrostatic column or other pressure or flow control device or any element the position of which varies or is varied.

The positioning or responsive element embodies a series of seat sockets, recesses or projections or like position controlling points which cooperate with the circuit controllers for governing the aforesaid selective circuits and the common starting circuits.

The separation of or spacing between these controlling points on the positioning element governs the extent of movement or action of the positioning element and connected elements or devices for corresponding increments or decrements of temperature or the like of the governing means.

In the preferred embodiment of my invention, the contacts of the control element and of the positioning element are mercury switches of the glass enclosed gravity type, thereby rendering the device suitable for continued operation for long periods and under conditions where little expert attention is available.

The contacts governed by the selector or positioning element are responsive to direction of movement as well as amount of movement of the controlling device. Hence, within limit, the positioning or responsive device will follow the movement or change of value of the controlling device or variable according to a straight line relation or any desired proportion or curve.

While I prefer to embody the variable relation of response by providing variations in the position of the seats or sockets on the plate, I may introduce a variable relation as by the introduction of a drum of varying diameter, as will be more fully set forth later, or by a cam, such as employed in the prior application above referred to. The plate having the recesses or notches is preferably removable so that another plate with different arrangement of recesses or notches may be substituted therefor, and by such a substitution of the plate any desired response of the responsive or positional element may be secured.

That is to say, the law of response to the controlling variable may be made anything desired by the substitution of a corresponding plate having embodied therein such variable law of response. Obviously uniform motion of the responsive element for uniform steps of the control element may be secured, and such uniform motion then translated into non-uniform motion as by means of a cam or any other transforming means.

A further feature of the present invention relates to the method of supplying steam to the radiators. In the prior application, above referred to, I have shown a system in which for the rates of steam supplied corresponding to a range of cold outside temperatures the radiators are filled with steam, and for the lower rates of steam supply corresponding to a range of milder outside temperatures the radiators are only fractionally filled through the means of restricting orifices. The preferred method herein shown provides for filled radiators at a variable differential throughout the cold range and for a fractionally filled radiator at variable differential throughout the mild range.

The orifices which are employed in the present system have the dual function of metering out the steam to the individual radiators throughout the mild part of the range of operation and have the further effect of restricting free flow or of holding back in the supply pipe the steam therein to facilitate distribution throughout all of the range of the heating system.

Consider, first, a system operating with filled radiators at the colder outside temperatures and having orifices for steam distributions in the main. It is to be observed that if the orifices are just right at a given pressure difference on the two sides of the orifice to pass enough steam to keep the radiators filled at the colder temperature ranges corresponding to maximum heat delivery, then as the weather moderates and less heat is required steam at a lower pressure and temperature is supplied to the radiators and the orifices which were adequate to pass the hotter and denser steam are now inadequate to pass sufficient flow of steam at the same pressure difference to keep the radiators full of the lower pressure and lower temperature steam.

I have conceived that the proper way to handle this situation is to vary the pressure differential. This, of course, may be done by regulation of the vacuum or regulation of the steam pressure as the independent variable, the other quantity becoming the consequent variable. In known constant differential types of systems it is customary to vary the steam pressure and to keep the return line pressure in predetermined value below the same, but in accordance with my new concept the steam pressure is varied according to one predetermined law and the return line pressure is varied as a consequent variable but not in the relation of a constant difference in pressure but a variable difference in pressure.

Now by combining the two series of operations as in my prior application, namely, of partially filled radiators for the lower rates of heat required, that is for milder outside weather, and employing constantly filled radiators for the greater demands of heat, or colder weather, I provide a mode of operation which is highly advantageous both in securing proper supply of steam to the radiators, that is the metering out of the heat, but also I secure the valuable effect of the orifices for steam distribution in and from the main under conditions where this has not heretofore been possible.

While I show the controller of my invention as applied to a steam heating system for securing the above desired result, it is to be understood that the method of heating might be embodied in a system employing an entirely different form of selector or control mechanism, or the method might be practiced by hand.

It is the object of the present invention to provide a novel method of steam heating and means for accomplishing the same, this means having further and independent uses.

Now in order to acquaint those skilled in the art with the manner of constructing and operating a device embodying my invention I shall describe in connection with the accompanying drawings a specific embodiment of the same.

In the drawings:

Figure 2 is a fragmentary side elevational view of a part of the responsive mechanism showing more particularly the switch mechanism;

Figure 3 is a top plan view of the same;

Figure 4 is a side elevational view with the cover plate removed taken on the line 4—4 of Figure 5 showing a modified form of selector or responsive device;

Figure 5 is a front view of the same as though viewed from the right of Figure 4;

Figure 6 is a top plan view of the same;

Figure 7 is a side elevational view partly in section showing the manner of mounting the two glass mercury switch bulbs on the rocking shafts of the device shown in Figures 4, 5 and 6;

Figure 8 is a diagram illustrating the action of the rollers and perforated plates. This diagram shows the roller on a scale sixteen times full size;

Figure 9 is a face view of the perforated plates;

Figure 9A is a diagram on a reduced scale illustrating the spacing of the perforations in the plate of Figure 9 for the steam heating system shown in Figure 1;

Figure 13:
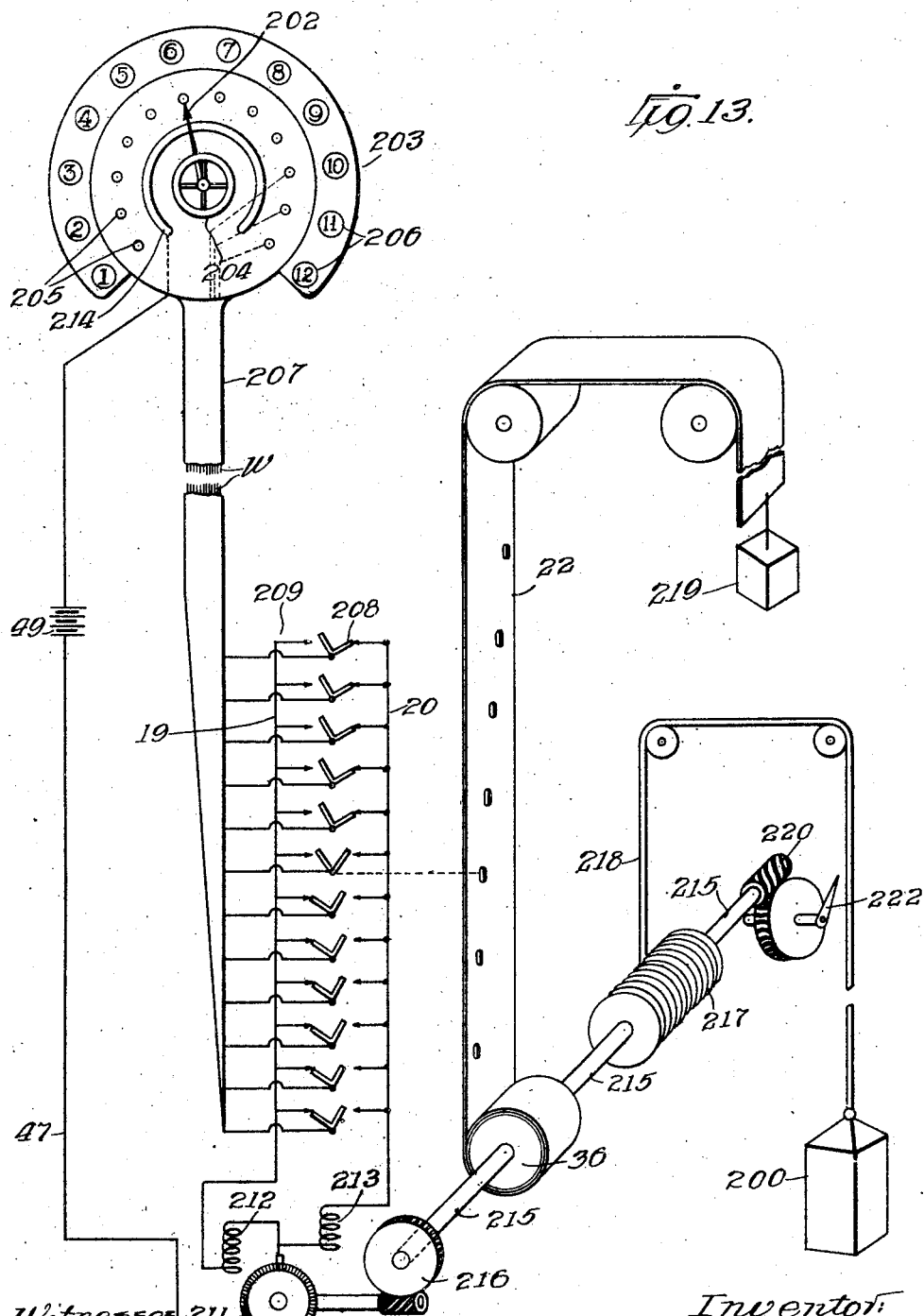

Figure 10, shown in two parts, is a diagram of a modified form of steam heating system for securing the heating diagram of Figure 11;

Figure 11 is a diagram of the method of heating secured by the system shown in Figure 10 part I and Figure 10 part II;

Figure 12 illustrates a modified form of winding drum;

Figure 13 is a diagram of a selector system embodying my invention;

Figure 14 is a fragmentary cross-sectional view illustrating a modified form of selector showing the selector plate mounted upon a sliding carriage;

Figure 15 is an end view of the adjustable mounting for the mercury switch bulbs; and Figure 16 is a cross-sectional view of a modified form of selector switch mechanism.

Figure 1:
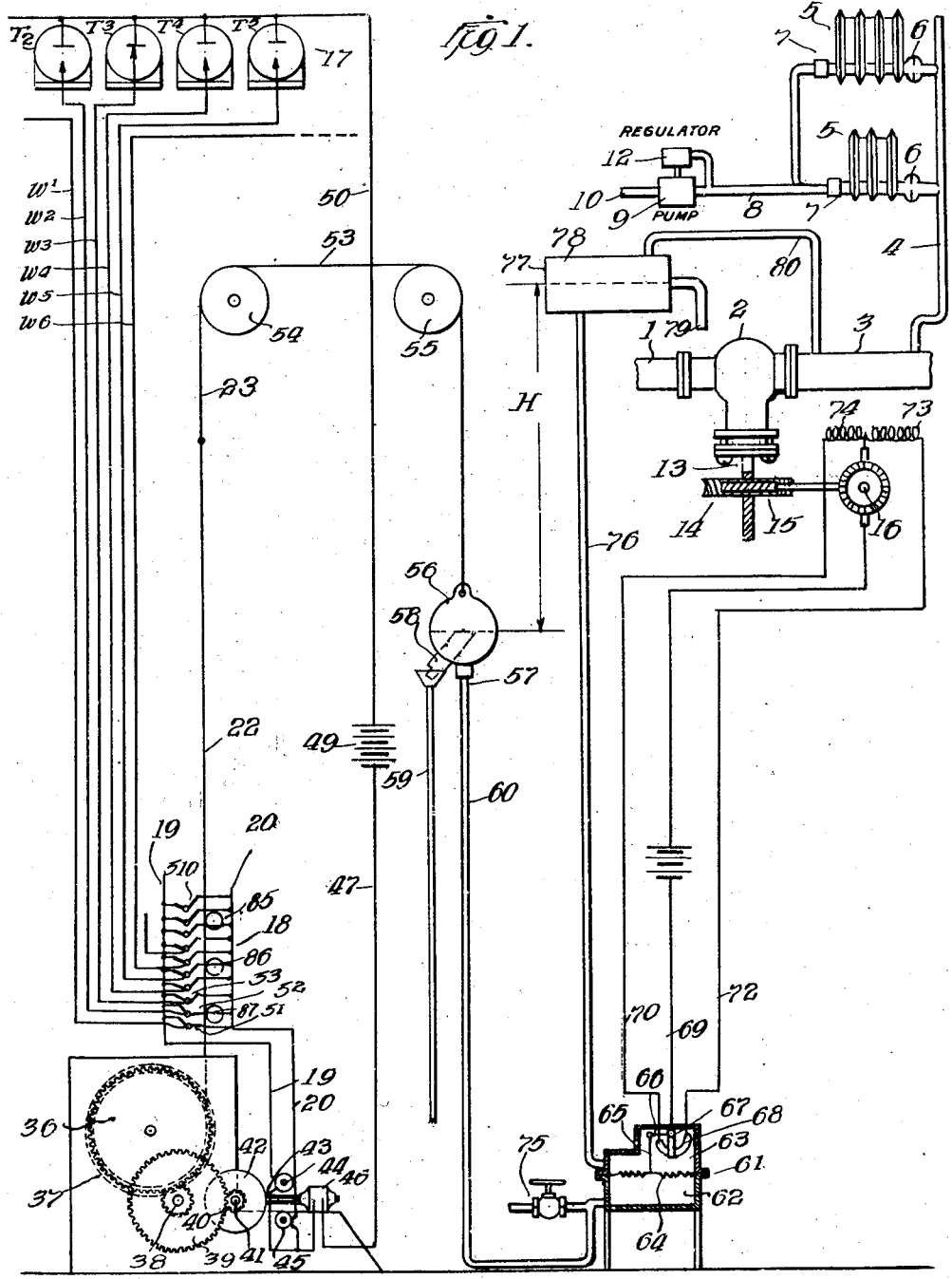
Figure 1 is a diagrammatic view of a steam heating system embodying my invention.

Referring now to the system shown in Figure 1, a steam supply line 1 is connected through a regulating valve 2 to a steam distributing main 3. Branches such as 4 lead from the distributing main 3 to the radiators such as 5, 5 being connected thereto through orifices 6, 6 so proportioned that the delivery of steam to the radiators 5, 5 may be controlled by varying the pressure upon the supply side of the said orifices. In the system herein shown traps 7, 7 of the wellknown thermostatic type are provided, although the use of these is optional. The return main 8 is connected through a vacuum pump 9 to a pipe 10 which may lead to a hot well or other means for returning the water of condensation to the boiler. The vacuum pump 9 is controlled by a regulator 12 for holding the vacuum in the return line 8 at a predetermined value or for otherwise regulating the vacuum which is maintained in the said return line by the pump 9.

The control valve 2 may be a straight throttle valve or it may be a diaphragm valve of the pressure regulating type. If the valve 2 is a throttle valve, then the pressure is regulated in the steam supply main 1 by a pressure regulator, but if no pressure regulator is present to control the pressure of steam in the main 1, then the valve 2 may be a variably loaded pressure regulator. As shown, the valve has a stem 13 which is adjusted axially as by means of the worm wheel 14 and the worm 15 driven by the reversible electric motor 16. The function of the valve 2 is to regulate the pressure of steam in the distribution main 3.

The pressure in the main 3 is regulated in accordance with outside temperature as ascertained by the bank 17 of thermostats such as $T_2$, $T_3$, $T_4$, $T_5$, etc. These thermostats have contacts which are adapted to be closed at a particular temperature but to be opened at any lower or higher temperature. The construction of these thermostats may be as shown in my copending application, above referred to. Instead of having separate thermostats with individual contacts a common thermostatic element controlling a number of circuits may be employed, as is well known in the art.

Each thermostat has its wire such as $W_2$, $W_3$, $W_4$, $W_5$, $W_6$, etc. Assume, for example, that there are ten thermostats in the bank 17 for controlling ten separate steps of temperature change.

These wires are preferably cabled and led to the selector 18 which contains a series of switch elements ten in number corresponding to the thermostats T. These switches such as $S_1$ to $S_{10}$, inclusive, are in reality selector switches for connecting the wires $W_1$ to $W_{10}$ to either the forward starting wire 19 or the reverse starting wire 20. The forward starting wire 19 is a bus to which the one outer contact of each of the switches in the selector 18 are connected and the reverse starting wire 20 is a bus to which the opposite outer contacts of the switches S are connected. The central contacts of the switches S are connected to the thermostat wires W and depending upon the position of these switches, the center contact is connected to either the wire 19 or 20 or is disconnected from both.

By reference to Figures 2 and 3, the structure of these switches and their mode of operation will be more apparent. Suffice it to say there is a perforated metallic band or strip 22 having a plurality of perforations therein (see Figure 9) which perforations are shown at 23, 24, 25, 26, 27 and 28 in Figure 9. Each perforation lies in a separate line or path, which path underlies a roller, such as the rollers indicated at 30, 31, 32, 33, 34 and 35 in Figure 3. The band 22 is adapted to be rolled upon a drum 36 which is geared through gear wheel 37 to the pinion 38, this pinion being driven by the gear 39 coaxial therewith.

A pinion 40 meshes with the gear 39 to drive it and a coaxial clutch disc 42 having a V-shaped groove in the periphery thereof is adapted to be engaged by a cone pulley 43. This pulley is pressed against one side or the other of the groove in the disc or pulley 42, as by means of the solenoids 44 and 45 which are connected, as herein shown, in series with the motor 46 which has a shaft driving the cone pulley 43. The shaft of the motor is provided with a flexible section to permit this operation. If desired, the solenoids 44 and 45 may be connected in parallel with the motor instead of in series. The construction of this gear reduction and reverse mechanism is substantially as disclosed in my aforesaid copending application. The motor 46 is connected to the common return wire 47 which is connected to one side of the source of current 49. The other side of the source of current 49 is connected to the common wire 50 leading to the contacts of the thermostats such as $T_2$ to $T_5$, inclusive, in the bank 17. All of the thermostats have one contact thus connected in parallel to the common wire 50 and the other contact of each of the thermostats has the individual wire leading to the individual switch 130 in the selector switch mechanism 18. The band 22 is connected to a flexible element 23 which may be a continuation of the band, if desired, or may be a cable or other flexible strand and this is run over pulleys 54 and 55 connected to the head 56 of the pressure accumulator 57.

This pressure accumulator comprises a hollow chamber having an overflow outlet 58 leading through a pipe 59 to a suitable point of discharge as, for example, the sewer.

The bottom of the head 56 is connected by a flexible hose 60 to the bottom chamber 62 of a pressurestat 61. The bottom chamber 62 is separated from the top chamber 63 by a flexible diaphragm 64 and this flexible diaphragm is connected through a stem 65 to an arm 66 pivoted at 67. The arm 66 forms one part of a bell crank the opposite arm of which is connected to a mercury bulb switch 68 having three contacts, namely, a central contact and two other contacts. The central contact is connected to the common wire 69 and the outer contacts are connected to wires 70 and 72, respectively. When the diaphragm 64 is in a predetermined neutral position the central contact is connected to neither of the outer contacts.

When the diaphragm is moved upwardly the central contact is connected to the outer contact at the right so as to connect wires 69 and 72 to energize the field 73 of the reversible motor 16, this causing operation of the motor in a direction to shift the stem 13 and movable valve plug in the valve 2 to change the pressure accordingly. When the diaphragm 64 is pressed downwardly below the neutral position the wires 69 and 70 are connected, thereby energizing the series field 74 of the reversible motor 16 and causing reverse operation of the valve stem 13 and its connected valve plug.

The lower chamber 62 of the pressurestat 61 is connected through the flexible hose with the variable pressure accumulator 57. A suitable inlet 75 for maintaining the variable pressure accumulator full to overflow at all times is provided. The upper chamber 63 is connected by a pipe 76 to the constant head pressure accumulator. The constant head pressure accumulator 77 comprises a chamber 78 which is connected by the pipe 76 to the upper chamber 63 of the pressurestat 61 so as to maintain at all times a definite head of liquid upon the upper side of the diaphragm 64. To maintain the fixed head of liquid an overflow pipe 79 is provided, this pipe preferably leading down to a water seal sufficiently far below the level of liquid in the chamber 78 as to prevent suction which may exist in the chamber 78 from drawing air or water through said pipe 79. The chamber 78 is also connected by the pipe 80 to the distribution pipe 3 of the steam supply system.

Referring now to the selector switch mechanism 18, and more particularly to the form shown in Figures 2 and 3, this mechanism comprises a guiding frame or box having the side walls 82 and 83 in which are fixed shafts such as 84 for guiding rollers such as 85 and 86. These rollers have grooves such as 88 therein for the purpose of clearing the rollers 30, 31, etc., which rollers 30, 31, 32, 33, 34 and 35 are mounted upon the inner arms, such as 89, of levers 90, the outer arms 92 of which are connected to tension springs 93.

The arms, such as 90 and 95 shown in Figures 2 and 3, are mounted upon individual shafts 96 and 97. Each shaft has connected thereto one of the switches such as $S_2$ and $S_3$, respectively. The switches are disposed alternately at opposite sides for the sake of compactness. The switch $S_3$ which is clearly shown in plan and in side elevation in Figures 3 and 2, respectively, comprises a hub member 98 with a carriage or socket 99 and 100 extending to the left and right, respectively, as viewed in Figure 2. In these sockets, which are U-shaped, are seated glass bulb mercury switches 102 and 103, respectively. These bulbs have contacts at their outer ends. The bulb 103 has the contacts 104 and 105 connected, respectively, to the wires 106 and 107. Likewise, the bulb 102 has the contacts 108 and 109 connected, respectively, to the wires 110 and 112. The wires 112 and 106 are connected together to one of the thermostat wires, for example, $W_3$. The outer wires 110 and 107 are connected to the forward and reverse starting wires 19 and 20, respectively. The leads from the mercury bulbs are preferably flexible so as not to interfere with the movement of the connected parts.

The switches $S_1$ and $S_{10}$, respectively, are all constructed in the same manner, each switch being mounted upon a rocking shaft and the rocking shaft having a lever such as 90 or 95 connected rigidly thereto, the spring connected arms, such as 92, lying on one side and the roller bearing arms, such as 89, lying upon the other side.

Now it can be seen that when one of the perforations such as 23, 24, 25, 26, 27 or 28 registers with its roller the roller will drop into the recess or perforation due to the tension of the corresponding spring 93 and this will move the corresponding switch into neutral position. It will be observed that the switch $S_3$ shown in full lines in elevation in Figure 2 and shown diagrammatically in Figure 1 is in neutral or open position. All of the switches $S_4$ to $S_{10}$, inclusive, above the switch $S_3$ are tilted so as to connect the wires $W_4$ to $W_{10}$ to the forward bus wire 19 while all of the switches below the switch $S_3$, namely, the switches $S_2$ and $S_1$, are tilted so as to connect the wires $W_2$ and $W_1$ to the reverse bus 20. However, the thermostatic contacts in the bank of thermostats 17 are all open except the contact $T_3$. Therefore, it will be seen that if the temperature should change so as to open the contacts of the thermostat $T_3$ and close, for example, the contacts of the thermostat $T_4$, the switch $S_4$ would immediately cause the motor 46 and the clutch 44 to be energized to start the perforated strip 22 into movement in the right direction, namely, in the forward direction, to cause the perforation lying in line with the roller of said switch to come under the corresponding roller and cause the switch $S_4$ to shift to the open position. At the same time the switch $S_3$ would be shifted to the same position as the switches $S_1$ and $S_2$ since the movement of the perforated plate 22 would cause the corresponding roller to ride out of the perforation and on to the unperforated part of the plate.

The motion of the plate or perforated strip 22 would thereby be transmitted to the variable pressure accumulator 57 to change the hydrostatic pressure in the chamber 62. This in turn would cause actuation of the switch 68 and a shifting of the position of the valve 2 accordingly.

Now referring to the diagram of Figure 1, the operation thereof will be more readily understood from the foregoing description. Assume that the radiators 5, 5 are to be maintained at atmospheric pressure, that is, the vacuum pump is not active or if active serves merely to return the condensate to the boiler and the return line 8 is open to atmosphere, the variable accumulator head 56 should be maintained with its liquid level above the level in the constant pressure accumulator by an amount which would represent the pressure of steam to be maintained in the distributing main 3 above atmosphere. In that event the head 56 would be above the tank 78 by a variable amount dependent upon the thermostat which is closed corresponding to the outside temperature.

If, as shown in Figure 1, the distributing main 3 is to be maintained at subatmospheric pressure and the interior of the head 56 is to be maintained at atmospheric pressure, the head 56 of the variable pressure accumulator 57 is maintained a variable distance H below the level of the fixed head accumulator 78.

Assuming that the pressure in the return line 8 is to be maintained at a definite subatmospheric pressure, the regulator 12 is set to maintain said definite subatmospheric pressure, which may be a constant, and the variable pressure in the distributing main 3 is maintained in accordance with outside temperature through the action of the thermostats in the bank 17 and the selector mechanism 18 operating to position the variable accumulator head 56 at the proper level to secure the correct delivery of steam to the radiators through the orifices 6.

The above system has been described as maintaining either atmospheric pressure in the return line or a fixed subatmospheric pressure, but it is to be understood that it is not essential that the return line pressure be maintained at a fixed value; it may also be varied in accordance with a predetermined schedule or curve.

The preferred method of operating the system and the means for doing the same is more fully shown in Figure 10, to which reference will shortly be had.

In Figure 8 I have illustrated the mode of co-operation of the roller, such as 34, with the perforation in the perforated strip or plate 22. The roller 34 swings about the shaft 97 as an axis and the various positions of the center of the roller are indicated by the arcuate line 115. Since the plate 22 is relatively thin and may, therefore, contain some considerable resiliency, the roller may be made to fit very accurately in the opening of the perforation.

This study of the motion of the roller shows how closely the opening and closing of the switches may be held to a definite position. I find that a 3° dip of the mercury switches is sufficient to cause the globule of mercury to roll from one end of the bulb to the other, and this three degrees of motion may be obtained with a motion as small as .0167 inches. The plate or strip 22 is much like the player piano music roll except that it is made, preferably, of spring sheet metal, such as sheet bronze or a thin band of steel, or the like.

Expansion of the band due to temperature changes is of no material consequence, particularly since the controller is placed within the building and is subjected to substantially constant temperature. In the embodiment shown in Figures 2 and 3, the side pieces 82 and 83 are connected by end pieces 116 and 117 for spacing the side plates or frame members 82 and 83 apart. The end member 116 also provides suitable anchorage for the spring anchors 118 for anchoring the outer ends of the tension springs 93. It will be observed that the tension springs work in either direction from a neutral position, that is to say, as the perforated plate 22 brings a perforation under a roller the tension of the spring 93 throws the roller into the aperture and this is true whether the roller enters the aperture above or below the neutral or open circuit position.

It will be observed that the selector switch mechanism 18 will stop the motor 46 when the apertured plate 22 has the corresponding openings registered with the selector switch, the circuit of which is closed at the thermostats. Thus all of the individual thermostat circuits and the common return circuits are normally in open circuit position.

The thermostats are so adjusted that there is a small range within which any particular thermostat will be closed, the thermostats on either side of the particular thermostat having their contact open. This is preferably secured by a double glass bulb mercury switch of the type herein disclosed. This switch will close the circuit at one particular central position and will open the circuit when tilted angularly in either direction from said neutral position. By reference to the diagram of Figure 1, it will be seen that switches above the switch $S_3$ are tilted in one direction whereas all of the switches below the switch $S_3$ are tilted in the opposite direction. This can be understood from the nature of the rocking arms and rollers and is also more clearly illustrated in the embodiment shown in Figures 4 to 7, inclusive.

Referring now to the embodiment shown in Figures 4 to 7, inclusive, the perforated strip 22 is guided over a base plate 120 which is provided with recesses, such as that indicated at 121, into which the rollers, such as 124, may drop when an aperture or perforation in the plate 22 presents itself. This base plate is secured between two side plates 127 and 128 and guiding and supporting posts, such as 129 of which six are shown, guide the apertured strip 22 between themselves and the base plate 120. The side plates 127 and 128 are secured to the base plate as by means of suitable screws 130. Additional spacing posts or pillars 132 connect the side plates 127 and 128 back of base plate 120.

Likewise, posts or pillars 133 are disposed between the forward edges of the side plates 127 and 128 and serve at the same time as anchors for the tension springs 134.

A series of rocker shafts 135, 136, 137, 138 and 139 projecting alternately from opposite sides of the frame are rotatably mounted in the side frames 127 and 128, and between said side plates 127 and 128 are provided with attached roller bearing arms 141, 142, 143, 144 and 145, respectively. Suitable collars 146', 146' upon each of the shafts hold the corresponding shafts endwise in alignment, the roller bearing arms being disposed in different longitudinal tracks on the perforated strip 22 so that each roller carried by the corresponding roller bearing arm will register with a particular perforation or aperture in the strip 22. This arrangement can be seen in Figures 5 and 6. By thus disposing the rollers side by side and guiding the strip between the side plates 127 and 128 accurate registration of the perforations with the rollers may be secured without interference and without appreciable weakening of the perforated strip 22 even though successive operations of the various shafts are to occur very close to each other.

Consider, for example, the diagram of Figure 9A showing the relative spacing of the perforations to secure ordinates of pressure difference for equal abscissa corresponding to temperature changes as recorded on thermostats in the bank 17.

It will be seen that some of these perforations come very close together, and if the roller bearing arms were all placed side by side in alignment and not spaced endwise of the strip 22 a very considerable weakening of the strip might be occasioned. The disposal of the rocking shafts with their corresponding roller bearing arms in spaced relation endwise of the strip 22, therefore, serves the important function of permitting any desired spacing of the perforations without appreciable weakening of the sheets. By reference to Figure 9 it may be seen that while the rocker shafts which bear the controlling switches for the thermostat circuits are spaced equal distances apart endwise of the strip 22, the perforations 23, 24, 25, 26, 27 and 28 are not equally spaced but are spaced varying distances corresponding to the chart of Figure 9A.

It will be observed in Figures 4, 5 and 6 that the rocker arm 143 bearing the corresponding roller 124 has moved into a horizontal position by the dropping of the roller 124 into an aperture in the plate 22, the plate having moved to the point where the switch connected to the shaft 137 is opened thereby opening the corresponding circuit of the thermostat or other switch mechanism which was closed to initiate the hunting movement of the strip 22. Generally speaking the operation of the selector system is to have the contacts closed one at a time successively, the contacts on each side of the closed contacts remaining open and the strip 22 is then caused to move to hunt a position which will open the circuit of the closed contact.

In the construction shown in Figure 4, if the next circuit should be closed through the switch of the arm 142, the strip 22 would be moved upwardly, first swinging the arm 143 into the dotted line position with the roller 124 lying above center thereby preparing a circuit for reverse movement, and the strip would continue until the roller bearing rocker arm 142 would be permitted to drop into its notch and assume the dotted line position 142A shown in Figure 4.

The rocker arms comprise a forked body portion which is drilled to receive a pin for mounting the roller and also drilled at its central part to receive the corresponding rocker shaft, the body of the arm being secured to the corresponding shaft by means of the threaded pin, such as 146, which performs the function of a set screw in clamping the body of the arm onto the rocker shaft and at its rear end forming an anchorage for the tension spring 134.

Each of the rocker shafts 135 to 139, inclusive, is provided with a switch mechanism, shown in Figure 7 and indicated by reference numeral 147. I have shown rocker shaft 137 as provided with a thin metal arm 148 which is bent into a U-shaped clip 149 at its upper end and is provided with a clamping screw 150. A pair of clamping discs 152 and 153 have their peripheries lying within the clamping clip 149 and subject to gripping by the screw 150.

These discs, which are shown in front elevation in Figure 15, have cradles 154 and 155, respectively in which are disposed glass bulb mercury switches 156 and 157 each having a pair of contacts adapted to be disconnected by the mercury globule therein when the bulbs are held in a level position. The cradles 154 and 155 are provided with extending ears 158, and set screws 159 and lock nuts 160 are provided for holding the bulbs in the cradles. The ears 158 are relatively weak for bending stresses so that they bend readily if too great a stress is imposed by the set screws 159 thereby preventing breakage of the glass bulbs.

The manner of connecting the two glass bulbs 156 and 157 is indicated more clearly in Figure 10, part I. A terminal of each of the bulbs 156 and 157 lying upon opposite sides of the rocker shaft 137 are connected together and to the thermostat wire $W_x$ leading to a particular thermostat $T_x$ as shown in Figure 10, part I. The other terminals of the bulbs 156 and 157 are connected to the reverse and forward starting wires 19 and 20.

Each of the shafts 135, 136, 137, 138 and 139 is thus provided with a switching mechanism of the type shown in Figure 7. The frame with the corresponding perforated strip 22 may be disposed in vertical or horizontal position, or in any intermediate position, the discs 152 and 153 which support the switch bulbs being adjusted accordingly to hold the bulbs 156 and 157 in horizontal position when the corresponding roller has dropped into its corresponding aperture in the plate or strip 22.

Referring now to the diagram of Figure 10 and the corresponding chart of Figure 11, I have shown a system for controlling the delivery of heat to a building in accordance with the requirements as determined by variations in outside temperature.

The critical point in the delivery of steam to orifices is the delivery of sufficient steam through the restricting orifice at the point where fractional filling of the radiator merges into complete filling of the radiator.

I have shown in Figure 11 two curves, the upper dotted line curve being indicated at DEF and the lower full line curve at ABC.

Assume for consideration of the present system, a radiator which in a 68° F. room gives out 240 B. t. u. when filled with steam at a pressure of 14.7 absolute and when filled with steam at absolute pressure of 16.7 pounds per square inch will heat the given room to 70° F. when the exterior temperature is zero degrees F. This radiator if filled with steam will require a certain other pressure $P_n$ to heat that room to 70° F. temperature when the exterior temperature is $t_n$F.

The curve ABC is a curve of pressures corresponding to the temperatures of steam in a filled radiator when the control of heat emission is due entirely to the steam temperature at the corresponding pressure $P_n$. The lower part of the range from the point B to C is difficult to carry out because of the difficulty of securing the high vacuums in the return line required to carry the same.

The curve ABF is the pressure prevailing in the return lines, as disclosed in my copending application Serial No. 356,650. The curve DEF is the necessary steam pressure curve at the upstream side of the radiator orifices required to completely fill the radiator with steam between points A and B, that is in the colder range, and to fractionally fill the radiator between the points B and F when operating on a partially filled radiator, as disclosed in my copending application above referred to.

I, therefore, maintain the return line pressure constant along the line BF through the milder range of temperature and only partially fill the radiators throughout this part of the heating range.

It will be seen that between the points B and E the greatest pressure difference between the supply and return lines is maintained and this is the point at which the partially filled radiator becomes a completely filled radiator and the method of controlling the heat output of the radiator is changed. That is to say, the temperature of the steam in the radiator throughout the chart or area BEF is the same and the heat output is controlled entirely by variations of quantity of steam in the radiator. This variation in quantity is secured by varying the pressure on the up stream side of the orifice. In that part of the chart defined by the area BEDA heat delivery is controlled by varying the steam temperature and the radiator is filled with steam at such varying temperatures and corresponding pressures.

Now the manner of securing this control is apparent from an understanding of the construction and mode of operation of the system shown in Figure 10.

In this system, as shown in Figure 10, part II, the steam supply main 1 supplies steam under proper pressure regulation through the valve 2 to the distribution main 3 and from the distribution main through suitable branches to the orifices 6, 6 of the radiators 5, 5. The radiators 5, 5 have the traps 7, 7 of the well known thermostatic type at the remote ends of the radiators in the connections to the return main 8. The return main 8 is connected to the vacuum pump 9 which is operated by the actuating motor 162 which is under suitable control to maintain the return line pressure as indicated by the curve ABF on Figure 11.

The variable pressure accumulator 57 is raised and lowered by a cable 53 under the control of the thermostatic device 17 to regulate the valve 2 to maintain in the distribution main 3 pressures as per the curve DEF. The flexible tube 60 of the variable pressure accumulator 57 is connected to the lower chamber 62 of the pressurestat 61. The upper chamber 63 is connected by the pipe 76 with the constant head pressure accumulator 77, the chamber 78 of which is connected by pipe 80 to the distribution main 3 and to an overflow pipe 79 leading to a low level well for sealing the same to prevent the escape of steam or the entry of air.

The diaphragm 64 of the pressurestat 61 operates upon the switch 68 to energize one or the other of the motors 163 and 164 to close or open the valve 2, or when the diaphragm 64 is in neutral position both motors are at rest both circuits being open. This phase of the system is like that described in connection with Figure 1.

A pressurestat 165 similar to the pressurestat 61 has a diaphragm 166 and a switch 167 which switch is adapted to be closed to start the circuit of the motor 162 for operating the vacuum pump whenever the pressure above the diaphragm 166 exceeds the pressure below the diaphragm 166. A variable head pressure accumulator 168 having a movable head 169 forming a chamber with an overflow 170 is connected by a flexible tube 172 to the lower chamber of the pressurestat 165. The upper chamber of the pressurestat 165 is connected by pipe 173 to the fixed head pressure accumulator 174 having a chamber 175 provided with an overflow 179 leading to a low level well for sealing the same to prevent the escape of steam or the entry of air and a connection 176 leading to the return main 8.

The head 169 is connected to a cable 177 for raising and lowering the head 169, the tube 172 extending through a stand or support 178 which has a seat 179 adapted to receive the head 169 and stop further downward motion by supporting said head in a fixed position.

When the head 169 rests upon the seat 179 the pressure maintained in the return line 8 is constant, that is, it arrives at the value fixed by the predetermined line FB on Figure 11. At the time the head 169 arrives in the dotted line position, that is, resting upon the seat 179, as shown in Figure 10, part II, the head 56 of the pressurestat controlling the steam pressure is in the dotted line position indicated at 56' in Figure 10, part II. The difference in height between the head 56' and the head 169 when it rests in its seat is shown as corresponding to the difference in pressure between the points B and E on the diagram of Figure 11.

This correspondence is merely for the sake of convenience in following the relation between the chart of Figure 11 and the diagram of Figure 10 and is not an actual relation since the head of water required to give a difference in pressure of one pound is well known. The heads 56 and 169 and their connecting tubes and chambers are kept filled with water to the overflow level through the water supply connections 75 so that at all times there is a slight overflow at the overflow pipes 58 and 170 for maintaining the variable pressure accumulator heads filled to definite points. Condensing steam in the chambers 175 and 78 assists in supplying the slight excess for keeping constant levels therein.

The thermostats in the bank 17 control a selector mechanism 18 which corresponds in general character to the selector switch mechanism 18 in Figure 1. In this case there are a number of cross-shafts such as 137 corresponding in number to the thermostats, and each cross-shaft has its corresponding mercury switches, its roller bearing arm and tensioning spring for cooperating with perforations in the plate 180 which corresponds in all respects to the strip or plate 22. The construction of the selector is more clearly indicated in Figure 14. There is provided a frame member 182 which may be a U-shaped frame member with side plates 183 secured to the sides of the channel or groove member 182. Rollers or rods 184 extend between the side plates 183 and serve to support the same and may also serve as means for holding the plates 180 in position upon the sliding support or frame 185. The plate 180 is secured onto the sliding support 185 and this sliding support is provided with a nut member 186 which is threaded upon the threaded shaft 187.

Rotation of the shaft 187 moves the slide 185 endwise and this carries with it the apertured plate 180. Suitable cross-shafts such as 137 having roller bearing arms 143 provided with rollers such as 124 cooperate with the perforations in the plate 180. The slide 185 is grooved in register with the rollers, such as 124, so that regardless of the position of the perforations in the plate 180 the roller may drop into the opening in the plate. The plate 180 may be selected from any desired number of plates having perforations for accomplishing the desired object. That is to say, the adjustment of the position of the perforations may be secured by substituting one plate for another.

In Figure 14 the switch is shown at the left whereas in Figure 10, for the sake of clearness, I have shown the switch controlled by the shaft 137 as disposed at the right. This is an immaterial detail. The switch shown in Figure 14 is constructed as shown in detail in Figures 7 and 15.

Any part of the sliding member 185 might be connected to a device which is to be moved in accordance with the law of operation of the same as determined by the perforations. In the present instance, the shaft 187 is driven in one direction or the other by the motors 189, 190 operating through a worm drive 192 to move the said shaft 187 rotarily in the selected direction.

In the present case motion is taken from the shaft 187 through the medium of the drum 193. The drum has a portion of larger diameter 194 and a portion of smaller diameter 195.

A cable 177 cooperates with one end of the larger diameter drum 194. The cable 53 cooperates with the smaller drum and a part of the larger drum 194. The character of the drum 193 may be widely varied, depending upon what effect is to be secured thereby. Since the movement of the slide 185 is in definite steps to bring the notches in the plate 180 in register with the corresponding roller arms, such as 143, under the control of the thermostats, these thermostats operating within definite temperature ranges or steps, it will be apparent that the smooth curve shown in the chart of Figure 11 will be only approximated. That is to say, instead of a smooth curve, steps or a stepped curve will be secured but the same is sufficiently close for my purposes. The steps may be relatively close or relatively far apart, depending upon the number of thermostats employed and the accuracy of response which can be secured by them.

The smaller part 195 of the drum 193 is employed to secure that part of the curve lying between the points E and F for variations of steam pressure in the distributing main 3. Obviously, by controlling the spacing of the apertures in the plate 180 the drum 193 might be of the same diameter throughout, or might be of any preferred diameter.

For example, in Figure 12 I have shown a modified form of drum 197 in which the portion which receives the cable 177 is shaped to assist in securing the curve AB and the portion of the drum 198 which cooperates with the cable 53 is shaped to assist in securing the curve DEF.

The operation of the system is as follows:—

Assume that the thermostat $T_x$ is closed and the thermostats on each side thereof open, the switch $S_x$ will close the starting circuit for one of the motors 189, 190 over one of the wires 19 or 20 to cause motion of the shaft 187. This motion of the shaft 187 causes the plate 180 to seek the proper roller and its roller arm with the result that the roller 124 drops into the corresponding aperture in the plate and opens the switch $S_x$, stopping the drum 193 in a fixed position. This fixed position holds the variable accumulator heads 56 and 169 in a corresponding fixed position to control the steam supply pressure in the main 3 and the return pressure in the main 8. The heads 56 and 169 are shown in a position corresponding to approximately fifteen pounds per square inch absolute pressure in the return line and a correspondingly higher pressure in the steam main 3. The difference in height corresponds to the difference in ordinates between the curves ABF and DEF at corresponding abscissæ. As the outside temperature moderates and the thermostats in the bank 17 successively energize their wires, the shaft 187 is actuated to cause the plate 180 to hunt the corresponding switch and actuate the same to open the starting circuit. The heads 56 and 169 will be lowered differentially to positions corresponding to the ordinates between the two curves above referred to. It will be observed that the large diameter portion 194 is connected to the steam pressure accumulator 56, whereas the end portion 196 of the drum 193 is connected to the vacuum controlling variable pressure accumulator head 169, and that these drums have different diameters.

The difference in diameter between the two drums represents the difference in rate of lowering of the two corresponding heads. Assuming that the variations in ordinates of the curve DEF are embodied in the spacing of the recesses in the plate 180, then the drum 194 and its auxiliary part 195 may have a straight cylindrical formation. It is preferable to have the two diameter drum 194—195, since at the point E it is desirable to change to a different rate so as not to require too great a length of perforated controlling strip 180. It is, of course, possible to use a single diameter drum throughout for the cable 53.

If desired, the spacing of the perforations on the plate 180 may be made uniform and the variations in travel secured by the shape of the drums as shown in Figure 12. The difference in curvature between the drum portions 198 and 197 represents the difference in rate of rise or fall.

When the head 169 rests upon its seat 179, it will not further descend and, hence, vacuum in the return line 8 is maintained at a fixed value corresponding to the horizontal line BF. The head 56, however, is still subject to the unwinding of the cable 53 from the drum 193 and it is preferable to have the cable 53 pass off of the portion 194 onto the portion 195 when the head 56 has arrived at the position corresponding to point E, the head 169 at the same time having arrived at its seat 179.

From that point on, the decrease in ordinates is at a less rapid rate.

The same theory may be built into the drum 198 shown in Figure 12. By this mode of operation, the maximum pressure difference is secured at the point where fractional filling of the radiator is converted into complete filling of the radiator, or vice versa, and the pressure difference is varied in order to make the orifices, which are of fixed size, effective to the desired degree in both ranges of the heating system.

I believe it is broadly new to control the differential on a filled radiator in order to hold the effect of an orifice, whether the orifice is also employed in another range for fractional filling, or is employed only for distribution purposes.

The selector mechanism of my invention may be used for general purposes, and in Figure 13 I have illustrated a system for controlling the positioning of an element, such for instance as an elevator cage 200, in accordance with the movement of an indicator, such as 202, which is moved to selected position for controlling the position of the elevator 200. In this case, the controller 203 has a manually controlled wheel 204 by which the contacting indicating arm 202 may engage any one of a series of contacts 205. Indications 206 may be placed at convenient positions to apprise the operator of the selected position. The contacts 205 are connected to the wires W of the cable 207, these wires leading to the common central point such as 208 of the selector switches in the bank 209.

The construction of this bank of selector switches is the same as that disclosed in Figure 1, and the mode of operation is identical therewith. The selector switches are preferably mercury bulb switches mounted upon rocking shafts, as heretofore disclosed, although I have shown the rocking elements, such as 208, as if they were bodily movable to cooperate with stationary contacts. The principle is the same whether a mercury gravity operated switch is employed, or whether rocking contactors are employed in connection with stationary contacts. The bus starting wires 19 and 20 operate to start the motor 211 through series fields 212 or 213 for forward or reverse motion of the motor 211. A common starting wire 47 and source of current 49 are connected in series with the common contact 214, which engages the movable contact 202. The movable contacts 202 may be shifted from one to the other of the stationary contacts, such as 205, and thereby cause the motor 211 to start and move the perforated plate or strip 22 to be shifted as by winding or unwinding from the drum 36, which drum is mounted on a shaft 215 driven through worm gears 216 from the reversible motor 211.

Instead of winding the strip 22 upon the drum 36 as herein shown, the form of device illustrated in Figures 10 and 14 may be employed.

The shaft 215 bears a cable drum 217 to which the elevator cable 218 is connected.

The strip 22, instead of being wound and unwound from the drum 36 and kept tight by the weight 219, may be a continuous belt or band and be moved through sprockets and perforations on the margins of the drum like a moving picture film.

The shaft 215 may be connected to any corollary mechanism, as through the worm gearings 220, to operate any other mechanism, either operating or indicating, as for example the indicator 222.

It is believed that the general applicability of the selector of my invention to general purposes will be apparent from the above.

I do not intend to limit the form of a selector strictly to a plate or band for operating a series of enclosed gravity switches, such as mercury bulb switches, as the principles of the invention may be embodied in a wide variety of forms; for example, as shown in Figure 16, a series of discs, such as 223 may be mounted upon a rotatable shaft 224, these discs having Geneva teeth such as 225, 226 and 227, respectively. Each tooth is individual to a disc, and the discs are placed side by side upon the shaft 224. Rocking shafts, such as 228, 229 and 230, have cooperating Geneva gear members 232, 233 and 234 in registration with the discs and adapted to be engaged by the corresponding teeth 225, 226 and 227.

Mercury switches of the type shown in Figures 7 and 15 are attached to the ends of the shafts 228, 229 and 230 and are suitably actuated in turn in order to secure the proper sequence of operation. In this manner, a number of such selector switches may be actuated successively by different angular positions of the shaft 224 just as such switches are operated by different vertical positions of the strip 22 shown in Figure 13.

I do not intend to be limited to the details shown and described.

I claim:—

1. A selector system comprising the combination of a series of circuits, controlling means for closing said circuits one at a time, motor means, a selector plate having a series of recesses, and being adapted to be moved by said motor means in either direction, a plurality of circuit controllers each comprising a common selector contact and a pair of selective contacts, the selective contacts of each pair being connected in multiple, a pair of starting wires for said multiple connection, each starting wire controlling one direction of drive imparted by the motor means to the selector plate, pivoted arms for the selector contacts, said arms being adapted to mesh with said recesses one at a time, said plurality of selector contacts being connected individually to said plurality of circuits.

2. A selector system comprising a series of circuits, controlling means for closing said circuits, one at a time, motor means, a selector plate having a series of recesses and being adapted to be moved by said motor means in either direction, a series of circuit controllers each comprising a pair of mercury bulb switches, said mercury bulb switches having alternate contacts adapted to be closed selectively by motion from either side of a neutral position, starting wires connected to said contacts, each starting wire controlling one direction of drive imparted by the motor means to the selector plate, pivoted arms for the switches, said arms being adapted to mesh with said recesses one at a time, said series of switches having each a common contact, said common contacts being connected individually to said series of circuits.

3. In combination, a series of selective circuits having contacts adapted to be closed one at a time in accordance with the variations of value of a controlling variable, a responsive member adapted to be moved to any one of a series of positions corresponding to the value of the controlling variable, motor means for moving said responsive member in direction and amount corresponding to the direction and amount of change of said controlling variable, said responsive member comprising a movable element having meshing means and having associated therewith a series of rocking members, a series of selector switches connected in said series of selector circuits, said switches comprising enclosed gravity operated mercury contactors, said switches being operated by said rocking members, and a pair of starting wires controlled by each of said selector switches for governing the direction of drive imparted by the motor means to the responsive member.

4. A system including the combination of a series of selective circuits having contacts, a movable selector member for switching said contacts one at a time, a responsive member adapted to be moved to respond at a distance to the movement of said selector member, motor means for moving said responsive member in direction and amount corresponding to the direction and amount of movement of the selector member, a series of two-way switches having forward, reverse and neutral positions, an operating member for each of said switches, each member having a meshing portion, said responsive member having meshing actuating means for cooperating with the meshing portions of the operating members of said switches to actuate said switches in succession, said switches being positively held in either forward, reverse, or neutral position, and a pair of common starting wires for controlling the direction of drive of said responsive member in forward or reverse direction by said motor.

JOHN A. SERRELL.